(12) United States Patent
Hartikainen et al.

(10) Patent No.: US 7,818,026 B2
(45) Date of Patent: Oct. 19, 2010

(54) CONFIGURATION OF A TERMINAL (75) Inventors: Rauno Hartikainen, Espoo (FI); Hannu Pirilä, Littoinen (FI); Matti Jokimies, Salo (FI)

(73) Assignee: Nokia Corporation, Espoo (FI)

( * ) Notice: Subject to any disclaimer, the term of this patent is extended or adjusted under 35 U.S.C. 154(b) by 854 days.

(21) Appl. No.: 10/580,571

(22) PCT Filed: Nov. 24, 2004

(86) PCT No.: PCT/FI2004/050174

§ 371 (c)(1),
(2), (4) Date: Mar. 2, 2007

(87) PCT Pub. No.: WO2005/050478

PCT Pub. Date: Jun. 2, 2005

(65) Prior Publication Data

US 2007/0259683 A1 Nov. 8, 2007

(30) Foreign Application Priority Data

Nov. 24, 2003 (FI) .................................. 20035218

(51) Int. Cl.
*H04M 1/00* (2006.01)
(52) U.S. Cl. .................... 455/550.1; 455/111; 455/124; 455/414.1; 709/203
(58) Field of Classification Search .............. 455/550.1, 455/403, 466, 412.1, 67.3, 425, 572, 433, 455/414, 435, 418, 414.3, 414.1, 414.2, 414.4; 709/203, 100, 217, 238, 226; 370/220.01, 370/410, 526

See application file for complete search history.

(56) References Cited

U.S. PATENT DOCUMENTS 5,086,452 A * 2/1992 Ito et al. ..................... 455/561

(Continued)

FOREIGN PATENT DOCUMENTS

EP   1 271 360   1/2003

(Continued)

OTHER PUBLICATIONS

Chinese Office Action dated Feb. 29, 2008, 4 pages filled in First Office Action form in English, 5 pages English translation of Text of First Office Action and 5 pages Chinese originals of both the form and the Text of the First Office Action citing CN1444748 (US counterpart US 2001/051997A1) and US 2001/0031626 (previously disclosed). Japanese Office Action for corresponding application No. 2006-540495 dated Aug. 18, 2009, 2 pages original Office Action, 4 pages English translation of text of Office Action, 6 pages total.

(Continued)

*Primary Examiner*—Tan Trinh (57) ABSTRACT

The invention relates to a terminal to be used in a system, which comprises a device management server and a data transfer network for transmitting information used in association with configuration between the terminal and the device management server. The terminal comprises means for detecting change in the terminal capabilities, and means for transmitting information on the change in the terminal capabilities to the device management server. In addition, the invention relates to a system for transmitting information used in connection with the terminal configuration between the terminal and the device management server. Further, the invention relates to a method in the configuration of the terminal, to a method for providing configuration information to the terminal, as well as to a computer software product to be used in the terminal configuration.

51 Claims, 7 Drawing Sheets

U.S. PATENT DOCUMENTS

| | | | |
|---|---|---|---|
| 6,108,540 A * | 8/2000 | Sonti et al. | 455/433 |
| 6,944,169 B1 * | 9/2005 | Yoshizawa et al. | 370/410 |
| 7,142,847 B2 * | 11/2006 | Umeda et al. | 455/418 |
| 2001/0031626 A1 * | 10/2001 | Lindskog et al. | 455/67.3 |
| 2001/0051997 A1 * | 12/2001 | Oku | 709/217 |
| 2002/0037714 A1 | 3/2002 | Takae et al. | |
| 2002/0150228 A1 * | 10/2002 | Umeda et al. | 379/220.01 |
| 2003/0055949 A1 * | 3/2003 | Coulombe et al. | 709/224 |
| 2004/0185885 A1 * | 9/2004 | Kock | 455/466 |
| 2005/0065801 A1 * | 3/2005 | Poikselka et al. | 705/1 |

FOREIGN PATENT DOCUMENTS

| | | |
|---|---|---|
| JP | 2001-256027 | 9/2001 |
| JP | 2002-111888 | 4/2002 |
| JP | 2002-259335 | 9/2002 |
| JP | 2002-268857 | 9/2002 |
| JP | 2002-330134 | 11/2002 |
| JP | 2003-087424 | 3/2003 |
| WO | 99/33293 | 7/1999 |
| WO | 02/35417 | 5/2002 |

OTHER PUBLICATIONS

Patent Abstracts of Japan, Publication No. 2002-330134, Date of publication: Nov. 15, 2002, 1 page.

Japanese Office Action dated Aug. 5, 2008 issued in parallel Japanese Patent Application No. 2006-540495, 4 pages in English (translation).

Japanese Office Action dated Aug. 5, 2008 issued in parallel Japanese Patent Application No. 2006-540495, 3 pages Japanese original.

Patent Abstracts of Japan, Japanese Publication No. 2002-111888 (patent family of US 2002/037714), published Apr. 12, 2002 (1 page).

Patent Abstracts of Japan, Japanese Publication No. 2002-268857 including 2 pages (pp. 5/8-6/8) of a machine translation and 1 page English abstract, published Sep. 20, 2002 (3 pages total).

Patent Abstracts of Japan, Japanese Publication No. 2002-259335 including 2 pages English Abstract and 3 pages (5/19-7/19) of a machine translation, published Sep. 13, 2002 (5 pages total).

Patent Abstracts of Japan, Japanese Publication No. 2001-256027 including 1 page English Abstract and 1 page extract from machine translation, published Sep. 21, 2001 (2 pages total).

Patent Abstracts of Japan, Japanese Publication No. 2003-087424 including 1 page English Abstract and 1 page extract from machine translation, published Mar. 20, 2003 (2 pages total).

* cited by examiner

CONFIGURATION OF A TERMINAL

CROSS-REFERENCE TO RELATED APPLICATIONS

This application is the U.S. National Stage of International Application Number PCT/FI2004/050174 filed Nov. 24, 2004 which was published Jun. 2, 2005 in English under International Publication Number WO 2005/050478 A1 and which claims priority under 35 USC §119 to Finnish Patent Application No. 20035218 filed Nov. 24, 2003.

FIELD OF THE INVENTION

The present invention relates to a terminal to be used in a system, which is provided with a device management server and a data transfer network for transmitting information used in association with configuration between the terminal and the device management server. In addition, the invention relates to a system, which is provided with a terminal, a device management server and a data transfer network for transmitting information used in association with configuration between the terminal and the device management server. In addition, the invention relates to a method in the configuration of a terminal, where information used in configuration is sent from the terminal to the device control server. The invention also relates to a method for providing configuration information to the terminal, where information used in configuration is sent from the terminal to the device control server. Further, the invention relates to a computer readable medium that may be embodied in a computer software product, the computer readable medium to be used in the configuration of a terminal, which computer readable medium comprises machine executable program commands for sending information used in configuration from the terminal to the device management server.

BACKGROUND OF THE INVENTION

Wireless communication networks and the Internet expand rapidly and the number of their users is increasing. Bringing advanced Internet services to the digital mobile communication devices of wireless communication networks, such as the so-called media phones, is possible, for example, by means of WAP technology. WAP is an open standard, which is designed to globally support most of the digital wireless communication networks, such as GSM (Global System for Mobile, communications), GPRS (General Packet Radio Service), PDC (Personal Digital Cellular), CDMA IS-95 (Code Division Multiple Access), TDMA IS-136 (Time Division Multiple Access), and third-generation networks, such as WCDMA (Wideband CDMA) and CDMA-2000.

The users of a terminal connected to the Internet have for a long time had the possibility to fetch multimedia components, such as images, text, short video clips and audio clips in electric form from some Internet server to their computer terminal. When the data transfer speeds increase and the capabilities of the mobile communication devices improve, the interest towards multimedia messaging service has now risen also in the wireless network.

When the multimedia messaging service has been developed in connection with wireless data communication systems, new problems have arisen, for example, because the capacity of a wireless terminal and a radio path is typically more limited compared to, for example, wired computer terminals and data networks.

For the third-generation mobile communication networks, such as WCDMA, has been developed a multimedia messaging service, where the messages stored in a certain message transmission centre and addressed to a wireless terminal are aimed to be transmitted to the wireless terminal as soon as it can be reached. However, problems may appear in sending multimedia messages to a wireless terminal: because of the limited memory space of the wireless terminal, such as a mobile communication device of a cellular network, the multimedia message does not necessarily fit in the memory in use of the mobile communication device. A multimedia message sent to a wireless terminal can also comprise such elements, which the wireless terminal cannot handle possibly because of technical limitations of the terminal (for example inadequate processing capacity, the lack of video capabilities, the lack of an appropriate software), in which case these said elements have been sent unnecessarily to the terminal by wasting radio resources.

Information on the capabilities of the wireless terminal is transmitted in a multimedia messaging service developed for third-generation mobile communication networks to the multimedia message communication network, so that in connection with multimedia message transmission it can be ensured that the receiving terminal can receive and handle the multimedia message by taking into account the special preferences of the user when necessary. Capability transmission can be performed in the different layers of the multimedia system protocol stack, such as the application layer and the transfer connection layer.

In connection with informing about the capabilities, information is sent from the wireless terminal to the multimedia messaging service system about the capabilities of the wireless terminal and the Multimedia Messaging Client used in it. These capabilities can be roughly divided into four different groups: 1) equipment capabilities, 2) software capabilities, 3) capabilities of the multimedia service application (User Agent), and 4) multimedia message -specific special capabilities.

Several of the above-listed capabilities include such capabilities, which are unchanged and mostly depend on the model and version of the terminal. Some of the capabilities of the terminal depend on, e.g. the applications used in the terminal. As examples of this kind of capabilities can be mentioned the software-based decoders, protocol capabilities, etc. supported in the terminal. These capabilities are relatively unchanged, but, for example, in connection with software updates or when connecting accessories to the wireless terminal, these software capabilities can change. The capabilities of a multimedia application include, e.g., capabilities of a multimedia message agent (MMS User Agent), the configurable preferences of the user, etc. The multimedia message-specific special capabilities are typically associated only with a certain multimedia message, and these capabilities are transmitted in connection with the multimedia message transmission in question.

A wireless session (WSP session) is created for each multimedia message in the multimedia messaging service developed for the WAP system. When creating each session like this, the wireless terminal receiving the multimedia message sends information about its capabilities to the multimedia messaging center. In order to implement this, a so-called User Agent Profile (UAProf) has been developed, which comprises information about the capabilities of the wireless terminal (CPI, Capability and Preference Information), such as information about the capabilities and the preferences performed by the user of the wireless terminal associated with the multimedia operations.

In some of the current mobile communication systems, the wireless terminal must be configured before developed services and transmission channels can be utilized. As examples of this kind of services and transmission channels can be mentioned the Multimedia Messaging Service (MMS), the WAP system (Wireless Application Protocol) and the GPRS packet transmission service (General Packet Radio Service).

The configuration of the wireless terminals can nowadays be performed, for example, manually, in which case the user of the wireless terminal sets the required parameters. For setting the parameters, the user can have provided the required instructions from, for example, the manufacturer of the device, from the operator's manual, or from the Internet. Setting the parameters can also be performed in such a manner that the user searches the Internet, for example, from the Internet pages of the terminal manufacturer or the service provider of the mobile communication network the form intended for the purpose and notifies in the form the phone number of the terminal and possibly information about the type of the terminal, after which the form is sent in order to gain parameters. As a response to the form, the parameters are sent to the terminal, for example, as a text message. The third configuration option is that a text message is sent from the wireless terminal to a specific number, which, for example, the device manufacturer or the service provider of the mobile communication network has informed. After this, the parameters are sent to the wireless terminal, for example, as a text message. The fourth possibility for providing parameters is that the user contacts the service center of the service provider and requests the parameters to be sent to the wireless terminal. In this alternative, the parameters are also sent, for example, as a text message. This kind of an arrangement has been described, e.g. in the patent U.S. Pat. No. 6,292,668 and in the specification "Smart Messaging Specification; Revision 3.0.0; 18.12.2000". With these above-described alternatives, the problem is, among other things, that they are at least partly manual, i.e. the user must himself/herself perform procedures before the parameters are sent to the wireless terminal. In practice, this means that not even nearly all users gain the parameters required for a wireless terminal in order to have use of the special capabilities of the wireless terminal. Thus, the users cannot utilize such provided services, the utilization of which presupposes at least providing or updating some parameters in the wireless terminal either. A result of this can also be that the service providers are not interested in offering such services if the numbers of users are not large enough.

The configuration of the wireless terminals can also be performed by the device manufacturer or dealer, but then restoring the parameter preferences according to the ones set by the manufacturer or the dealer can be difficult if the parameters have changed after this. In this kind of parameter setting it is not easy to notice the individual preferences or needs of a user, in which case the parameter preferences are not necessarily appropriate from the point of view of the user. This arrangement is not practical either, if the user has gotten the wireless terminal, for example, as used.

The configuration performed by the manufacturer or dealer also suits poorly such situations where the parameter preferences of the wireless terminal have for some reason been corrupted or reset to the initial preferences, for example when the user has input some information erroneously, or if the user has loaned his/her wireless terminal to someone else and this person has changed the parameters.

Some automatic configuration solutions have been developed for correcting the deficiencies of setting the parameters manually. For example, for 3GPP ($3^{rd}$ Generation Partnership Project) standards has been introduced a so-called Automatic Device Configuration (ADC), where the user does not need to do anything but at most accept the parameter preferences in order for them to be usable. This method is based on that a change in a capability of the wireless terminal is detected in the system. When a change in the capabilities has been detected, the information about the parameters of the wireless terminal can be changed accordingly. Detecting a change in the capabilities can be performed, for example, by means of the equipment identity and the subscriber identity.

Figure 1:
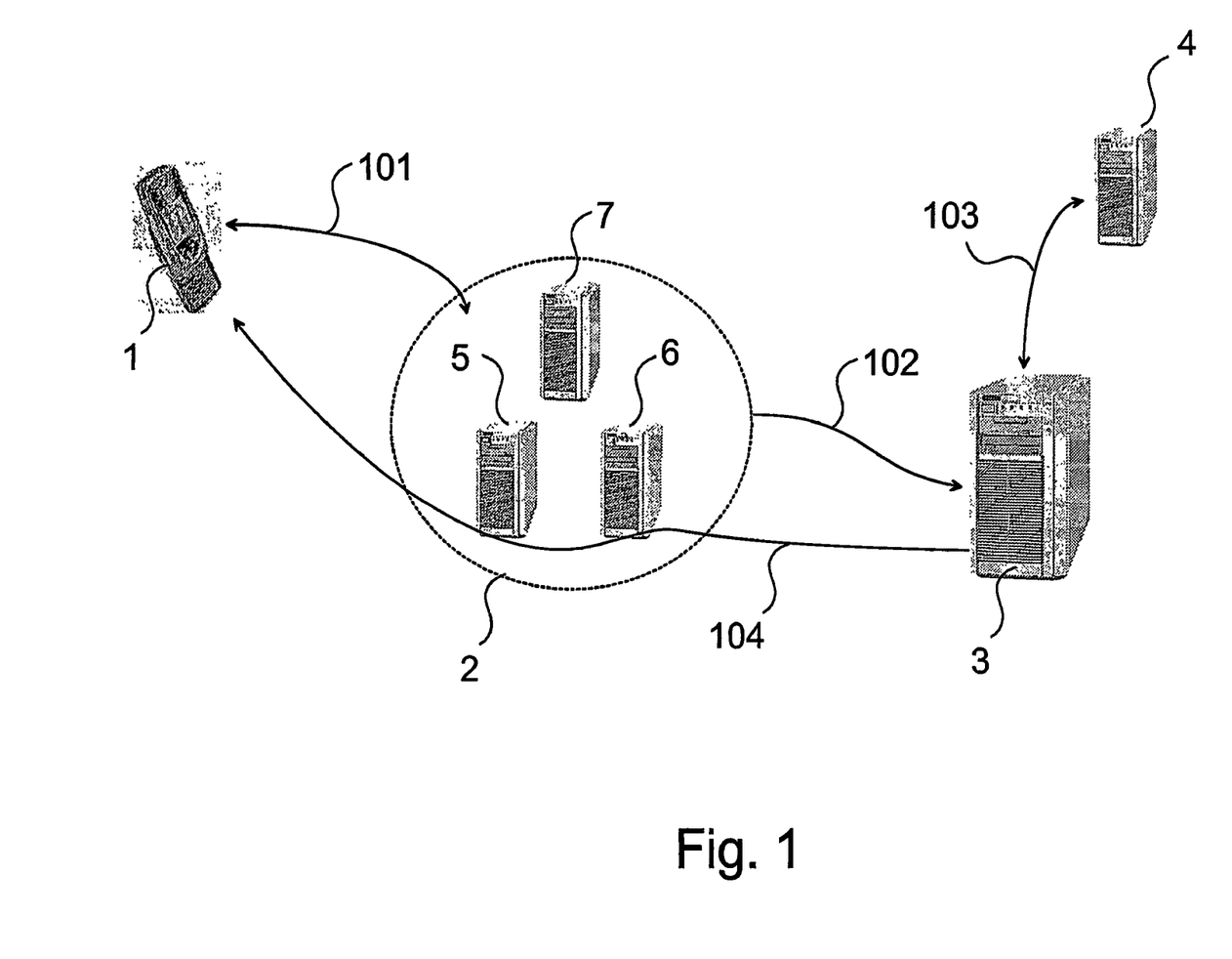
FIGS. 1 to 4 present solutions used in configuring a wireless terminal according to prior art.
Figure 2:
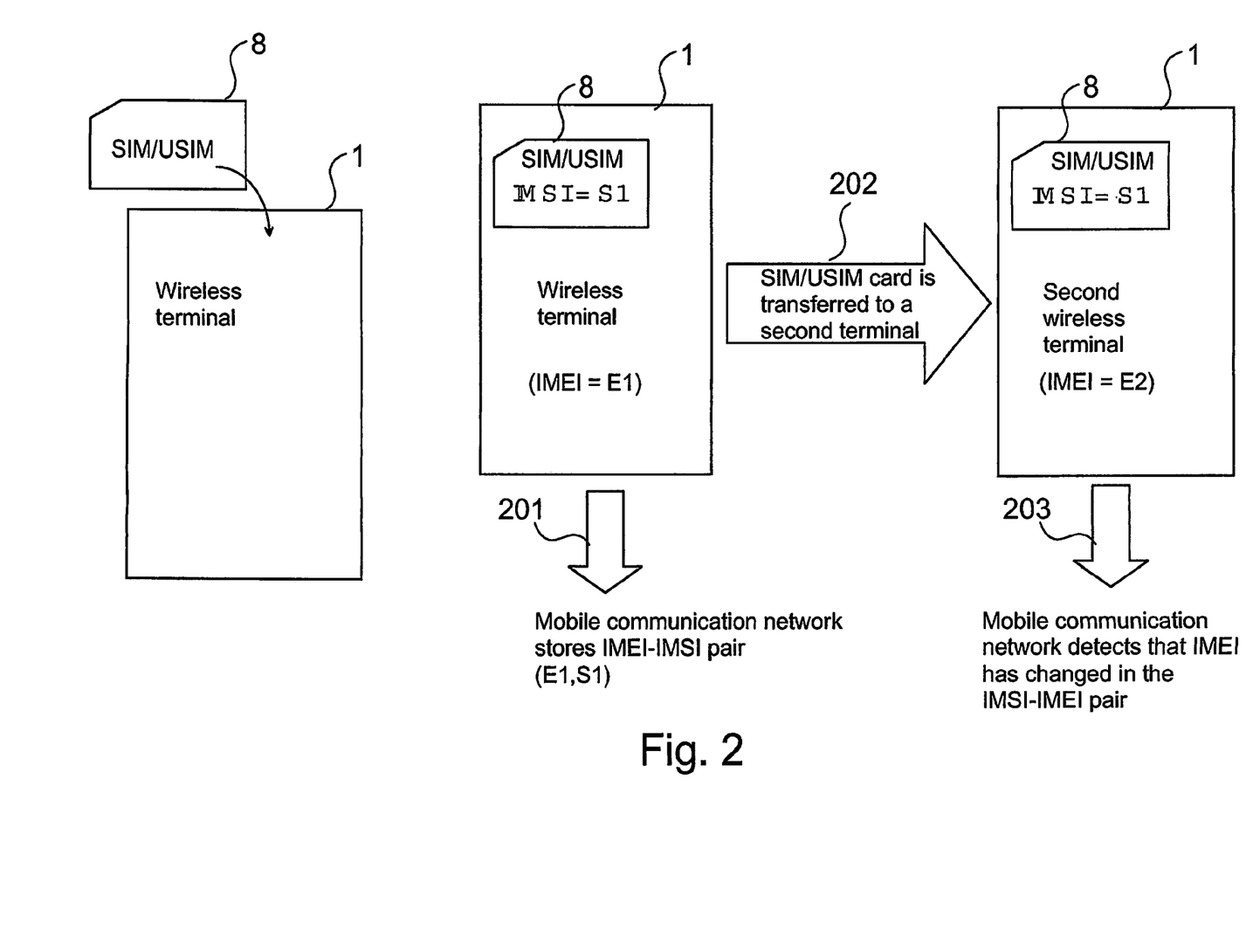

An identifying equipment identity is specified for wireless terminals, such as IMEI (International Mobile Equipment Identity). An individual identity (IMSI, International Mobile Subscriber Identity) has been specified for the mobile phone subscriber as well, which is stored in the subscriber card 8, for example a SIM card (Subscriber Identity Module) or an USIM card (UMTS Subscriber Identity Module). This SIM/USIM card is set into the wireless terminal before it can be used in wireless communication. FIGS. 1 and 2 present this operating principle in a simplified manner. First, the equipment identity (IMEI) of the wireless terminal and the user identity (IMSI) are sent 101 from the wireless terminal 1 to the mobile communication network 2. The information is stored 201 in the mobile communication network 2 as an equipment identity—subscriber identity pair, in which case when the wireless terminal 1 connects to a mobile communication network 2 the next time, or when the mobile communication network 2 specifically requests it, both said identities are again sent from the wireless terminal 1 to the mobile communication network 2. After this, an earlier stored equipment identity—user identity pair is searched for on the basis of, for example, the user identity in the mobile communication network. Now it is possible to compare 203 the stored equipment identity and user identity to an equipment identity and user identity received from the wireless terminal 1, and if the received equipment identity is not the same as the stored equipment identity, it can be concluded that the user has changed the wireless terminal 1 to some other wireless terminal. From the mobile communication network 2 is sent 102 a message to a Device Management Server 3 (DMS), in which message the change in the wireless terminal 1 of the user is notified. Information about the new equipment identity is also transmitted in the message. The device management server 3 fetches 103, on the basis of the equipment identity, information about the capabilities of the wireless terminal 1 in question from the database 4. The device management server 3 forms a configuration message, where there are new parameters, which correspond to the capabilities of the wireless terminal, and sends 104 a message, for example as a text message, to the wireless terminal. In the wireless terminal 1 the parameters are fetched from the received text message and stored. When necessary, it is possible to before storing and use of the new parameters still to confirm from the user whether he/she accepts the new parameters.

The above-mentioned sending of the equipment identity and user identity is performed by the request of the mobile communication network 2, for example, when switching the wireless terminal 1 on. The mobile communication network can request the sending of the identities for some other purpose, for example, in order to identify terminals marked on a so-called black list, and in order to disconnect the connection to this kind of terminals, and to utilize the identities received in this connection.

The database 4 used in storing the device-specific information can be, for example, an internal database of a service provider of a mobile communication network, or it can be an external database maintained, for example, by a device manufacturer. Device-specific information can be searched from the database 4 by using either the entire equipment identity or a part of it. For example, if the same capabilities are usable for such devices where a certain part of the equipment identity (for example, TAC, Type Approval Code) is the same, it is enough that the capability information is searched solely on the basis of this specific part.

Figure 3:
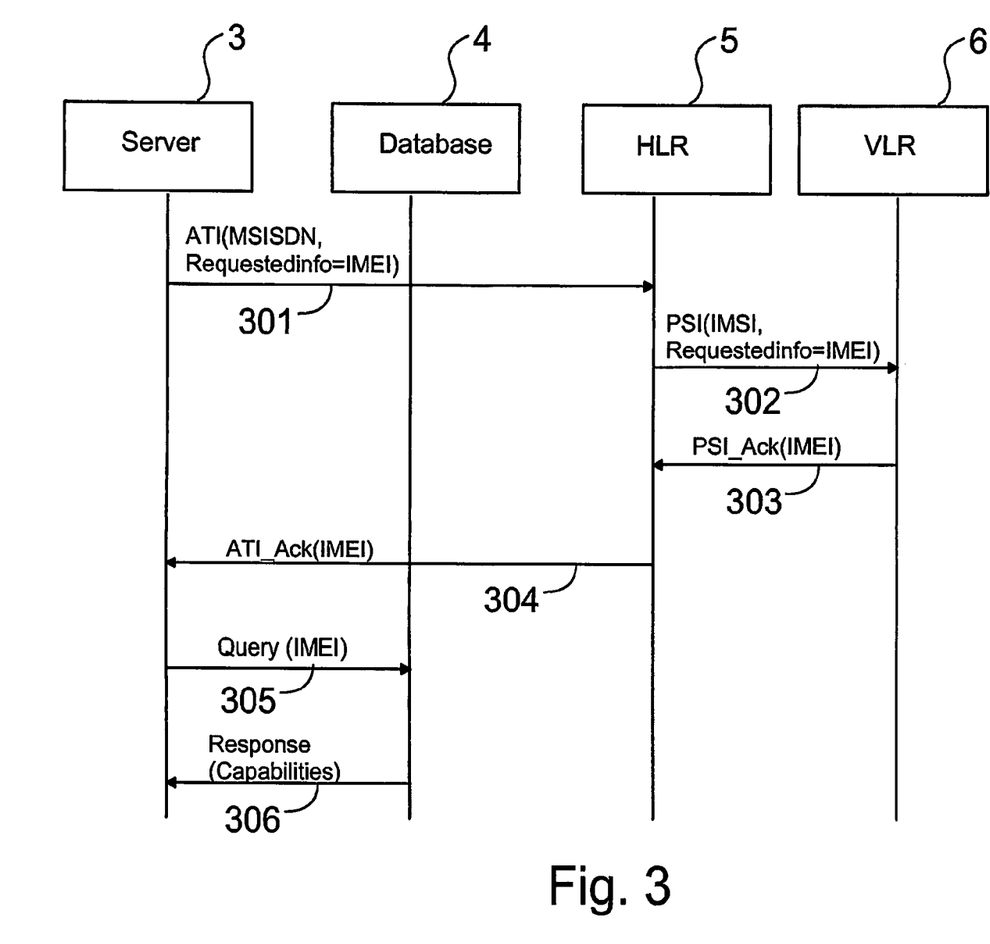

Another possibility for getting the user identity, equipment identity and device-specific information is based on using the device management server. This is illustrated in FIG. 3. The device management server 3 contacts the Home Location Register 5 (HLR) specified for the user of the terminal 1, for example, with an Any Time Interrogation message (ATI) according to the so-called MAP specifications (Mobile Application Part). With this MAP ATI message 301 the server 3 requests the home location register 5 to send the equipment identity IMEI of the wireless terminal 1 in question. Information about the identity of the user, for example a phone number (MSISDN) is transmitted in the message. The home location register 5 transmits 302 the request to the corresponding Visitor Location Register 6 (VLR), or the like, with, for example, a Provide Subscriber Info message PSI according to the MAP specifications. The visitor location register 6 that has received the request message sends 303 a response message to the home location register 5, which transmits the requested equipment identity IMEI, if it can be found. This equipment identity is transmitted 304 from the home location register 5 further to the device management server 3 that has started the request, for example, with an ATI acknowledgement message ATI_Ack. The equipment identity IMEI is transmitted in the acknowledgement message. After this, the device management server 3 determines 305, 306 the capabilities of the device in question from the database 4 on the basis of the equipment identity IMEI. After this, the device management server 3 can send a configuration message to the wireless terminal 1, as in the above-described first alternative.

Yet another alternative method for controlling the change of terminal is based on the clarification performed by the user module SIM, USIM. Thus, an application has been assembled in the user module, such as an USIM/SIM Application Toolkit (USAT) for performing certain operations. By means of these operations, the user module determines the equipment identity IMEI from the wireless terminal, for example, always after the wireless terminal has been switched on. If the equipment identity differs from the equipment identity determined in connection with the previous query, it can be concluded that the user module has been assembled in some other device, i.e. the wireless terminal of the user has changed. As a result of this, information on the change of terminal is sent from the wireless terminal to the mobile communication network. After this, the information on the new terminal can be fetched, for example, by means of the above-described principles.

Figure 4:
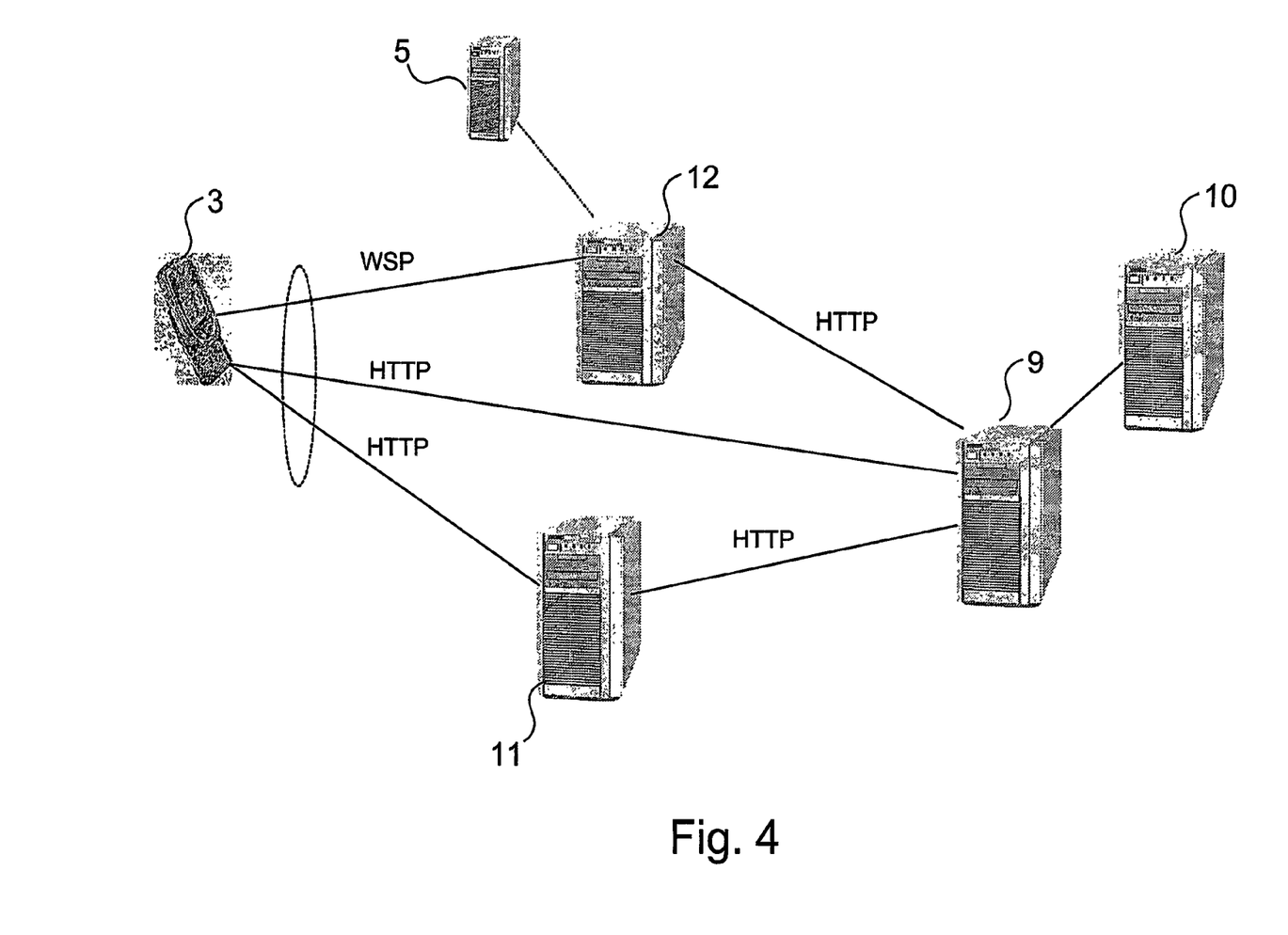

After the wireless terminal 1 has been configured, the situation may be that all the services, which the user of the wireless terminal has taken into use are not necessarily aware of the capabilities of the wireless terminal or the preferences of the user. The result of this can, for example, be that the contents provided for the wireless terminal 1, for example multimedia contents, are not compatible with the capabilities of the wireless terminal 1 and the preferences of the user. In order to remove this problem, a mechanism has been developed, by means of which the User Agent Profile (UAProf) can be transmitted to the server, from which the content connected to some service is sent to the wireless terminal. This user profile contains information on the capabilities of the device and the preferences of the user. This information is also referred to in short as CPI (Capability and Preference Information). The server sending the content can, on the basis of the user profile it has received, select and/or modify the content being sent to such that the receiving wireless terminal 1 can handle the content appropriately. FIG. 4 presents the central elements of this user profile function: wireless terminal 1, content providing server 9, profile storing location 10, http repeater 11, WAP gateway 12, and home location register 5. Also, an example of protocols that are used in the connections between different operational blocks of the system is marked in the figure. For example, between the wireless terminal 1 and the WAP gateway 12 can be formed a so-called WAP session, where WSP protocol is used (WAP Session Protocol). Between the WAP gateway 12 and the content providing server 9 is used, for example, http protocol, as well as between the wireless terminal 1 and the http repeater 11, between the wireless terminal 1 and the content providing server 9, as well as between the http repeater 11 and the content providing server 9. CPI information and an indicator for this information (URI, Uniform Resource Indicator) are transmitted, for example, in the address field of a WSP or http message.

It is possible that the WAP gateway does not use this CPI information, but it can replace it entirely or partly with some other information, for example, if on the basis of the information from the home location register 5 it is determined that the received CPI information cannot be applied as such in the wireless terminal in question or for the user in question. In addition, in the case of such wireless terminals, which do not support the above-presented UAProf function, the WAP gateway can form this CPI information.

It should also be mentioned that in some cases instead of http protocol it is possible to use wireless http protocol (Wireless http, W-http). However, this as such has no significance in connection with this invention. In addition, there can be more than one of said indicators URI, but this also has no significance from the point of view of applying the present invention.

It is an aim of the present invention to provide an improved method in connection with the configuration of a wireless terminal. The invention is based on the idea that in a wireless terminal a change is detected in some capability and on the basis of this, information on this change is sent to the system. Thus, the system takes care of providing parameter preferences corresponding to the new capabilities and of transmitting it to the wireless terminal in order to configure it. To put it more precisely, the terminal according to the present invention is primarily characterized in that the terminal comprises means for detecting a change in the capabilities of the terminal, means for transmitting information on the change of the terminal capabilities to the device management server, and means for receiving new parameter preferences corresponding to the changed capabilities sent from the device management server. The system according to the present invention is primarily characterized in that the terminal comprises means for detecting a change in the terminal capabilities, in which case the system comprises means for transmitting information on the change in terminal capabilities to the device management server, means for determining the parameter preferences corresponding to the changed capabilities, and means for sending the parameter preferences corresponding to the new capabilities to the terminal for terminal configuring the terminal, and which terminal comprises means for receiving new parameter preferences sent from the device management server. The method according to the present invention is primarily characterized in that in the terminal are examined the changes in the terminal capabilities, and if a change in terminal capabilities is detected, information on the changed capabilities is transmitted to the device management server, where the preferences of the parameters corresponding to the changed capabilities are determined and information on the new parameter preferences is sent to the terminal, where the configuration of the terminal is performed according to the new parameter preferences. The method for providing configuration information for the terminal according to the present invention is primarily characterized in that in the terminal are examined the changes in the terminal capabilities, and if a change in terminal capabilities is detected, information on the changed capabilities is transmitted to the device management server, where the preferences of the parameters corresponding to the changed capabilities are determined and information on the new parameter preferences is sent to the terminal, where the configuration of the terminal is performed according to the new parameter preferences. The computer readable medium according to the present invention is primarily characterized in that the computer readable medium comprises machine executable program commands for determining capability change of the terminal, for sending information on the changed terminal capabilities to the data transfer network to be delivered to the device management server, for receiving new parameter preferences sent to the data transfer network from the device management server, and for configuring the terminal according to the new parameter preferences.

SUMMARY OF THE INVENTION

The present invention shows remarkable advantages over solutions of prior art. In the system according to the invention it is possible to also detect such changes in the terminal capabilities, which are not based on the change of the user module or the equipment identity. Thus, for example, after new applications (application software) have been installed in the wireless terminal, or when auxiliary cards have been installed in or removed from the wireless terminal, this kind of changes can also be detected and information on them can be transmitted to the data transfer system, in which case the wireless terminal can be configured to better correspond to these new capabilities. Thus, sending such content that is not suitable to be presented in the wireless terminal in question is avoided, and on the other hand, the sent content can be modified to such form, which can be handled in the wireless terminal receiving the content. Thus, by means of the invention it is possible to reduce the delivery of content that is useless or of the wrong type from the point of view of the wireless terminal to the wireless terminal.

In the following, the invention will be described in more detail with reference to the appended drawings, in which.

DETAILED DESCRIPTION OF THE INVENTION

Figure 6:
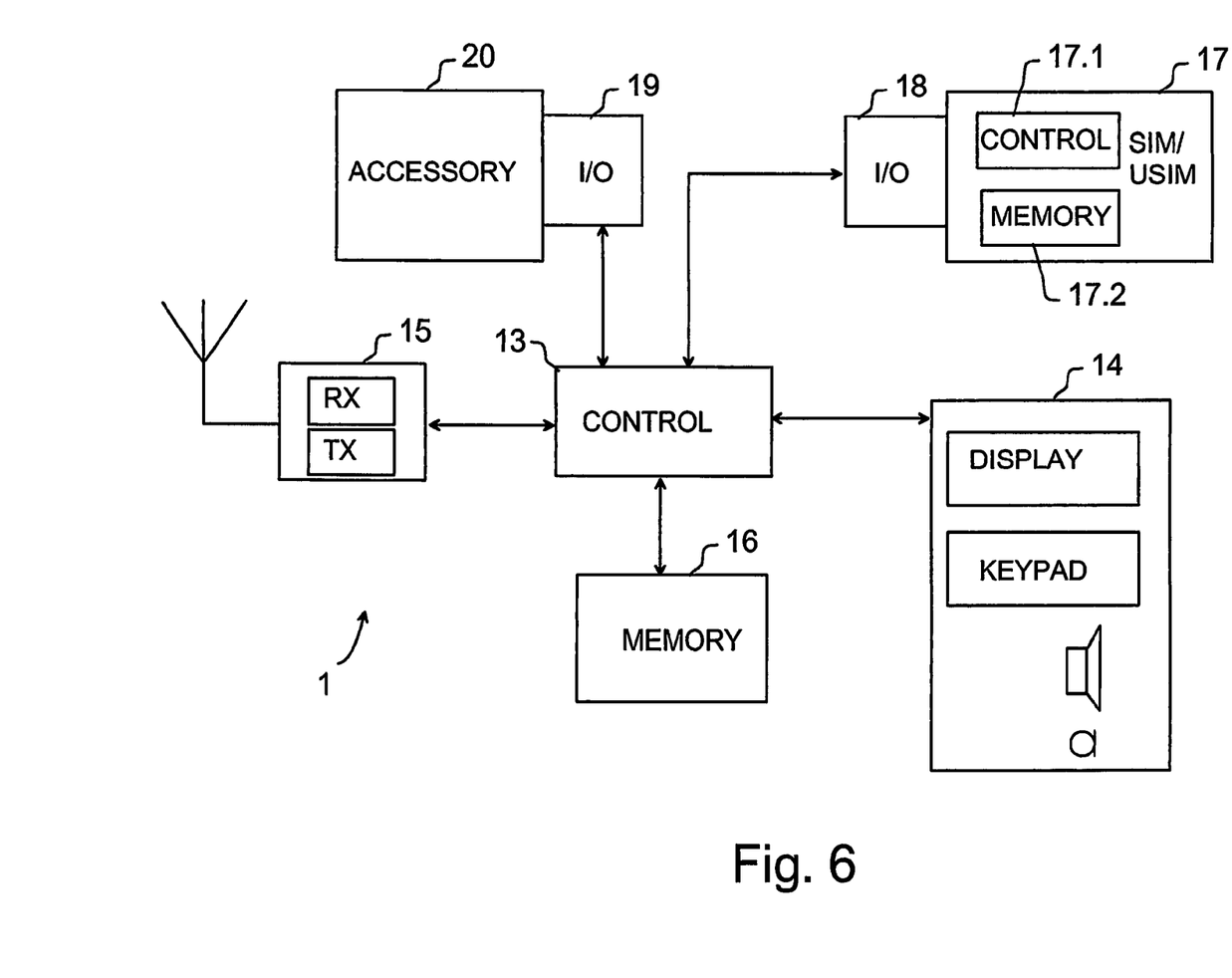
FIG. 6 presents the wireless terminal according to an embodiment of the invention in a reduced block chart.
Figure 7:
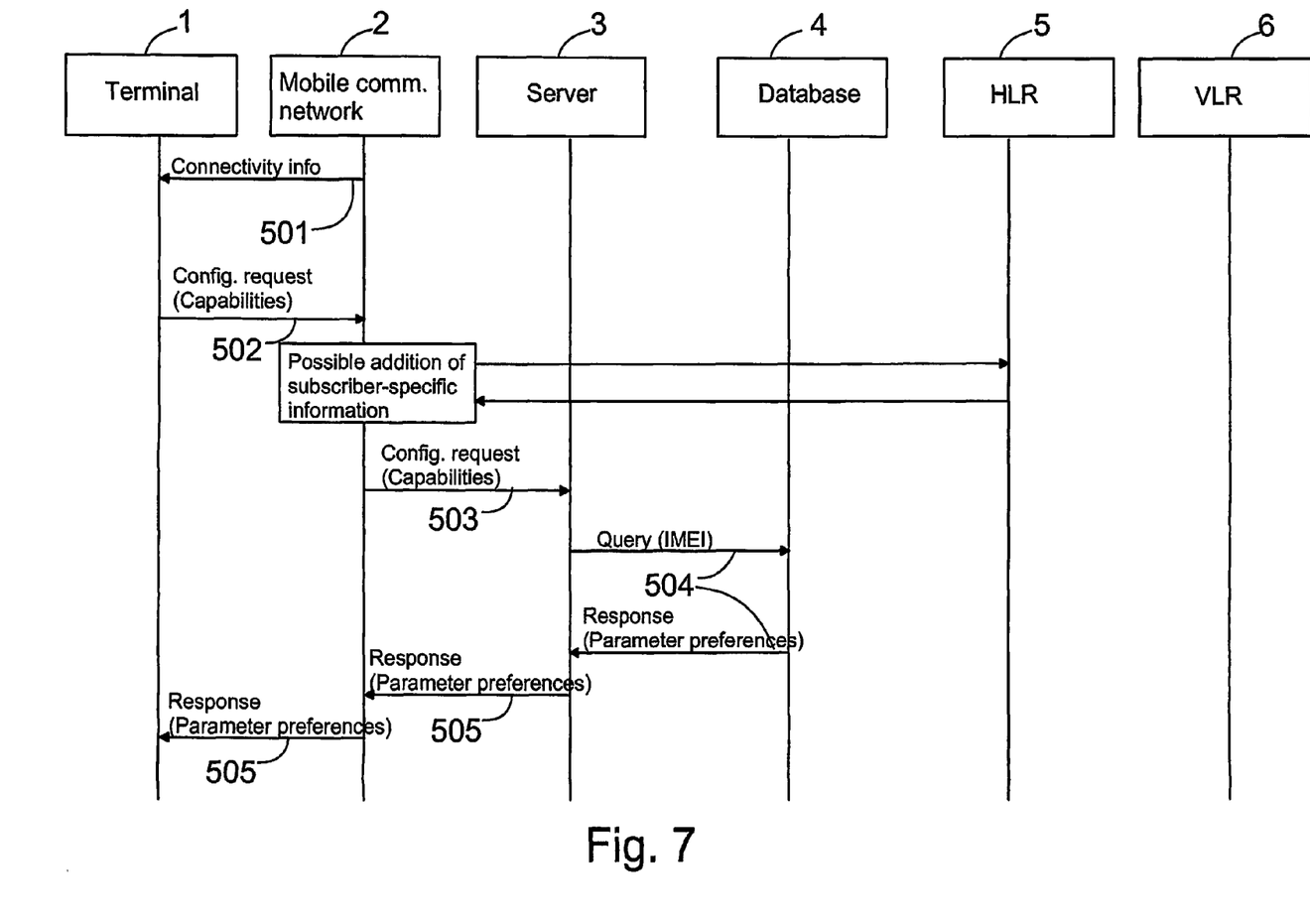
FIG. 7 presents, as a signalling chart, the data transmission used in a method according to an embodiment of the invention.

FIG. 6 shows, in a reduced block chart, a wireless terminal 1 complying with an embodiment of the invention. The wireless terminal 1 comprises, e.g. a control block 13, user interface 14, data transfer means 15, and memory 16. In addition, the wireless terminal 1 comprises a user module 17, such as a SIM card or a USIM card, as well as a user module interface 18 for connecting a user module 17. User-specific information is stored in the user module 17. The memory 16 of the wireless terminal 1 comprises changeable memory, such as RAM memory, non-volatile random access memory (NVRAM) and possibly also permanent memory (ROM) e.g. for storing the equipment identity IMEI. The equipment identity IMEI can also be stored in the non-volatile memory in a location, which the user and the applications cannot change. There can be one or more accessory interfaces 19 in the wireless terminal, to which it is possible to connect accessories, such as a memory card or the like in order to increase the memory content of the wireless terminal 1. In connection with this accessory interface 19 is arranged a connection bus 19.1 or the like, by means of which it is possible to transfer information in the wireless terminal 1 between the accessory and the wireless terminal 1. The connection bus can, in some applications, also be used for detecting the connection or removal of an accessory and for identifying the type of the accessory.

The following is a description of the operation of the method according to an embodiment of the invention in a wireless terminal 1 as shown in FIG. 6. When operating voltage is connected to the wireless terminal 1, the control block 13 performs the start-up program in a manner known as such. In the start-up program, certain operating preferences of the wireless terminal 1 are set as valid. These operating preferences can be stored in the memory 16. In addition, the user module interface 18 and the accessory connection 19 are activated. Also, the user module 17 is typically provided with its own control block 17.1, memory 17.2 and interface 17.3, where there is, e.g., a connection bus for transferring information between the user module 17 and the wireless terminal 1. The activation of the user module interface 18 starts the execution of program code in the control block 17.1 of the user module 17 as well.

In the user module 17 is, for example, installed an USIM/SIM Application Toolkit application, which performs the determination of the equipment identity of the wireless terminal, for example, in the following manner. The user module 17 sends an equipment identity query to the wireless terminal 1. As a response to this, the wireless terminal 1 sends the equipment identity IMEI to the user module 17. In the user module 17 is performed a comparison with the equipment identity possibly stored in the memory 17.2 of the user module. For example, the control block 17.1 of the user module can comprise a comparing element 17.1.1, which is configured to perform the comparison. If an equipment identity is not yet stored in the user module or if the stored equipment identity is not the same as the equipment identity IMEI sent from the wireless terminal 1, it can be assumed that the wireless terminal 1 or the user module has been started up for the first time, or the user module 17 has been moved to some other wireless terminal 1. The user module 17 stores the equipment identity IMEI received from the wireless terminal 1 if the equipment identity is not the same as the previously stored equipment identity, or if the equipment identity has not previously been stored in the memory 17.2 of the user module 17. The user module 17 sends information on the comparison to the wireless terminal 1, in which case it can be concluded in the wireless terminal 1 whether there is a need to perform the configuration of the wireless terminal 1 on the basis of the equipment identity IMEI. The wireless terminal 1 can request information about the user identity IMSI from the user module 17. The wireless terminal 1 can thus compare the user identity IMSI to the equipment identity IMEI, in which case it can be concluded in the wireless terminal 1 whether there is a need to perform configuration of the wireless terminal 1 on the basis of the user identity IMSI. For example, the control block 13 of the wireless terminal can comprise a comparing element 13.1, which is configured to perform the comparison of the user identity IMSI and the equipment identity IMEI, and to perform the determination whether there is a need to perform configuration of the wireless terminal 1 on the basis of the user identity IMSI. There are also other possibilities to implement the comparison and determination stages than mentioned above.

The accessory connection 19 is also examined in the wireless terminal 1 and it is aimed to determine whether some accessory 20 or accessories have been installed in the accessory connection 19. This can be performed, for example, by examining the status of one or more lines of the connection bus 19.1. For example, the control block 13 of the wireless terminal can comprise a detecting element 13.2 configured to examine the status of the lines of the connection bus 19.1, or the status may be detected by some other means. It is possible that information on the accessories connected to the wireless terminal 1 can have been stored in the memory 16 of the wireless terminal 1 after the previous start-up. Previously stored information can be compared to said status of one or more lines. If the comparison shows that the statuses do not correspond to each other, it can be assumed that an accessory or accessories have been installed in the accessory connection 19, or some installed accessory has been removed or changed into some other accessory 20. Thus, the accessory configuration has changed, which can affect how the wireless terminal 1 can handle, for example, multimedia contents. Information on the accessory configuration is sent to the system for configuring the wireless terminal 1 when necessary.

In addition to equipment changes in the wireless terminal 1, it is also possible to determine the applications installed in the wireless terminal 1 and the changes in them, when necessary. This can be performed, for example, in such a manner that in connection with installing the application, the operating system 13.3 of the control block 13 or the like stores information about the installed application, as well as information on that the capabilities of the wireless terminal 1 have changed. Correspondingly, when removing an application, information on the changed capabilities of the wireless terminal 1 is set.

Figure 5:
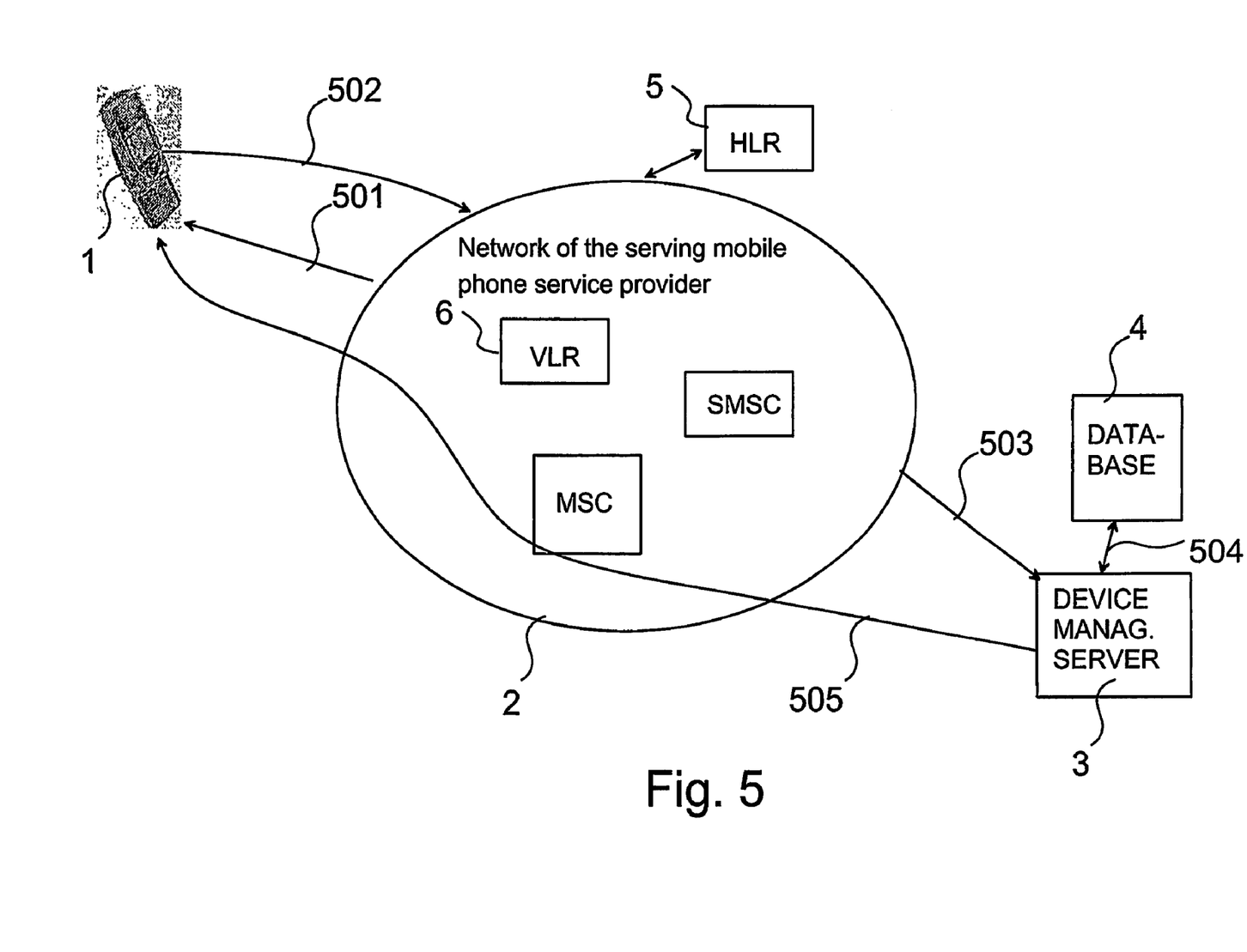
FIG. 5 presents, as a simplified chart, the arrangement according to the present invention.

When the control block 13 detects that the capabilities of the wireless terminal 1 have changed, the necessary procedures are performed for sending information on the change of capabilities to the device management server 3. FIG. 5 illustrates the phases of a method applied in a system according to an embodiment of the invention for informing about the change of terminal 1 capabilities and for configuring the wireless terminal 1. The mobile communication network 2 can at some stage have informed 501 the wireless terminal 1 of that user profile-based (UAProf) data transmission mechanisms can be used in the mobile communication network 2. After this, the wireless terminal 1 sends 502 a request message for providing parameter preferences to the wireless terminal 1. This request message is represented by arrow 501 in FIG. 5. This request message is sent via, for example, some signalling channel (e.g. USSD, Unstructured Supplementary Service Data) of the mobile communication network 2 to the mobile communication network, because data transmission based on IP protocol cannot in all cases be used in this phase. The wireless terminal 1 attaches to this request information about the device capabilities, for example, in UAProf form. Thus, the request message comprises either the capability information of the device or one or more indicators, such as URI, for the device capability information. The request message is received in the mobile communication network 2, where the information contained by the request message of the capabilities of the wireless terminal 1 is determined. After this, a message according to, for example, some standard is sent 503 in the mobile communication network 2 to the device management server 3. This message contains information on the capabilities of the wireless terminal 1, which was transmitted in the UAProf structure sent by the wireless terminal 1. The mobile communication network 2 can also add service provider specific information of the mobile communication network to this message, when necessary. The handling and forwarding of the request message received from the wireless terminal 1 is performed, for example, by WAP gateway 12 or some other network element. The device management server 3 determines 504 from the database 4 the parameter preferences suitable for the wireless terminal 1 in question and performs the transmission 505 of these parameter preferences to the wireless terminal 1 for the configuration of the wireless terminal 1. The device management server 3 can comprise e.g. a receiver 3.1 for receiving information, a transmitter 3.2 for transmitting information, a memory 3.3 for storing information, and a control block 3.4 for controlling the operation of the device management server 3 and for implementing operations to be performed by the device management server 3 in connection with the present invention.

The above-mentioned capability information of the wireless terminal can be received with the updated software when the software is updated. The capability information can also be received from an accessory when new accessories are possibly added in connection with the wireless terminal 1.

It is possible that the parameter preferences received from the device management server 3 are modified or new preferences are added to them in the network elements before the parameter preferences are transmitted to the wireless terminal 1. Another alternative is that from the device management server 3 is received the information, which does not contain the actual parameters, but on the basis of this information the parameter preferences are created in other network elements.

In an embodiment of the invention, at least the following information is sent from the wireless terminal 1 to the mobile communication network 2 and further to the device management server 3: The protocol supported by the wireless terminal 1, which protocol can be used in transmitting parameter preferences to the wireless terminal 1, information about the manufacturer of the wireless terminal 1, information about the model of the wireless terminal 1, and information about the software version of the wireless terminal 1. The above-mentioned information is attached, for example, to the fixed part of the UAProf message.

The UAProf message structure can also be used to notify of a change in the capabilities of the wireless terminal 1, for example, in a situation where some service or content has been installed in or removed from the wireless terminal. In the wireless terminal 1 it is also possible to detect the possible resetting of the parameter preferences, so re-configuration can be performed in many such situations where the systems according to prior art do not detect a configuration need of the wireless terminal 1. A service provider of the mobile communication network used by the user of the wireless terminal 1 can, for example, change the services in use in the mobile communication network. As an non-restricting example can be mentioned a situation, where the normal Circuit Switched Data service (CSD) is replaced by, or in addition to it there exists the possibility to use a High Speed Circuit Switched Data connection (HSCSD). This new service can be installed in the wireless terminal 1 for example by changing the capabilities of the user module 17. Thus, in the wireless terminal 1 it is possible to detect a new service and/or a change in the service preferences/capabilities and to transmit information about this to the device management server 3. On the basis of this information, the device management server 3 can perform the configuration of the wireless terminal 1 to correspond to the situation according to a new service/service preference.

The invention is also suitable to be used in situations where a user module 17 installed in a wireless terminal 1 is changed to some other user module 17. Thus, the equipment identity remains the same but the user identity changes. The change can, however, be detected in the user module, if no equipment identity has been stored in it, or the stored equipment identity is not the same as the equipment identity of that wireless terminal where the user module was installed. In some applications it is also possible that the wireless terminal 1 detects a new user module 17.

In practice, situations may also arise, where some other user module 17 is temporarily changed into a wireless terminal 1. Thus, the equipment identity of the wireless terminal 1 has been stored in the removed user module 17. After the installation of another user module, a change of equipment identity is detected, in which case the re-configuration of the wireless terminal 1 is performed. When the removed user module 17 is the next time re-installed into the wireless terminal 1 without the user module 17 in question having in the meanwhile been installed in some other terminal, the equipment identity stored in the user module 17 corresponds to the equipment identity of the wireless terminal 1. However, the wireless terminal 1 can have in the meanwhile been configured as different because some other user module has been in the wireless terminal 1. In this kind of a situation it is possible in the wireless terminal 1 to perform, for example, the examination of the user identity stored in the user module 17. In order to perform this, a user identity has been stored in the memory of the wireless terminal 1 on some other time of use. By comparing this stored user identity to the user identity stored in the user module, it can be determined whether some other user module has been installed in the meanwhile in the wireless terminal 1 and to start-up the reconfiguration of the wireless terminal 1, if necessary.

An alternative is that the parameters stored by all the users that have used the wireless terminal 1 are stored in the wireless terminal 1, as well as the user identities corresponding to them. If a previously used user identity and the parameters corresponding to it are in the wireless terminal 1, the request going to the data transmission network is prevented and the previously stored parameters are taken into use.

The method according to the invention is suitable to be used also at the first start-up time of the wireless terminal 1 and/or the user module 17. Thus, an equipment identity is not necessarily stored in the memory 16 of the wireless terminal or the memory 17.2 of the user module, which is detected in said comparison with the equipment identity IMEI of the wireless terminal 1.

Even though the use of UAProf messages has been presented above, it should be evident to anyone of skill in the art that also other message structures can be applied in connection with the present invention. In addition, in situations where the wireless terminal 1 cannot perform the start-up of WSP or http sessions, in which case the UAProf messages are not available to be used, it is possible to also use some other suitable message transmission. This may be necessary, for example, in the case of a new wireless terminal, or if the GPRS and WAP parameters of a wireless terminal have reset.

The method can also be applied in situations, where the user requests the parameters to be formatted via a user interface. In this case, the request sent to the mobile communication network is substantially the same as in the case initiated by the wireless terminal 1.

In connection with the present invention it is also possible to utilize, for example, the operational parts of a GPRS packet network etc.

As the wireless terminal 1, it is possible to use, for example, a wireless communication device, such as the Nokia 9210i Communicator, a mobile communication device, etc.

It should be realized that the present invention is not limited solely to the above-presented embodiments but it can be modified within the scope of the appended claims.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A terminal to be used in a system comprising a device management server and a data transfer network for transmitting information used in connection with configuration between the terminal and the device management server, the terminal comprising a detecting element configured to detect a change in the capabilities of the terminal, a transmitter configured to transmit information on the change of the terminal capabilities to the device management server, and a receiver configured to receive from the device management server new parameter preferences corresponding to the changed capabilities for the configuration of the terminal.

2. The terminal according to claim 1 comprising at least one accessory connection, wherein said detecting element comprises a connection bus for detecting whether an accessory has been connected to said accessory connection.

3. The terminal according to claim 1 comprising at least one user module installed to the terminal, and said detecting element comprising a user module connection for transmitting information between the user module and the terminal.

4. The terminal according to claim 3, wherein a user identity is stored in the user module, that a user identity read previously from the user module is stored in the terminal, wherein the terminal further comprises a comparing element for comparing the user identity stored in the user module and the user identity stored in the terminal in order to determine a change in the terminal capabilities.

5. The terminal according to claim 3, wherein an equipment identity is stored in the terminal, that an equipment identity read previously from the terminal is stored in the user module, wherein the terminal further comprises a comparing element for comparing the equipment identity stored in the user module and the equipment identity stored in the terminal in order to determine a change in the terminal capabilities.

6. The terminal according to claim 1, comprising an installing element for installing and updating applications in a terminal as well as for removing them from the terminal, in which case said detecting means comprises means for detecting the installation, update and removal of applications.

7. The terminal according to claim 6, wherein the capability information of the terminal has been provided to the terminal in the installed application.

8. The terminal according to claim 6 comprising an application controlling element configured to change the preferences of the application, wherein said detecting element is configured to detect change in the application preferences.

9. The terminal according to claim 1 comprising an installing element for installing and updating a service in a terminal as well as for removing an installed service from the terminal, wherein said detecting element is configured to detect the installation, update and removal of the service.

10. The terminal according to claim 9 it comprising a service controlling element for changing the preferences of the service, wherein said detecting element is configured to detect a change in the service preferences.

11. The terminal according to the claims 1 comprising message formation element configured to form a request message including a request for providing parameter preferences to the terminal, and said transmitter is configured to send said request message to a data transfer network.

12. The terminal according to claim 11, wherein said request message is a UAProf message.

13. The terminal according to claim 1 configured to send at least the following capability information via a mobile communication network to a device management server:
 a protocol supported by the terminal, which can be used in transmitting parameter preferences to the terminal,
 information on the manufacturer of the terminal,
 information on the model of the terminal, and
 information on the software version of the terminal.

14. The terminal according to claim 1, comprising memory for storing all the parameters stored by the users that have used the terminal, as well as the corresponding user identities, wherein the terminal further comprises an examining element configured to examine whether the previously used user identities and the corresponding parameters are stored in the terminal, wherein the terminal is configured to prevent sending information on the capabilities of a terminal to a data transfer network if the examining element detected that the previously used user identities and the corresponding parameters are stored in the terminal, and configured to take the previously stored parameters into use.

15. The terminal according to claim 1, wherein it is a wireless terminal.

16. A system comprising:
 a terminal;
 a device management server; and
 a data transfer network for transmitting information used in connection with terminal configuration between the terminal and the device management server;
 said terminal comprising: a detecting element configured to detect a change of the capabilities of the terminal;
 the system further comprising:
 a transmitter configured to transmit the information on the change of the terminal capabilities to the device management server;
 a determining element configured to determine parameter preferences corresponding to the changed capabilities; wherein said device management server comprises a transmitter configured to send the parameter preferences that correspond to the new capabilities to the terminal for configuring the terminal; and
 the terminal comprises a receiver for receiving from the device management server new parameter preferences for the configuration of the terminal.

17. The system according to claim 16, wherein the device management server comprises a controlling element configured to determine the parameter preferences that correspond to the terminal capabilities, and a transmitter for sending the parameter preferences via a data transfer network to the terminal.

18. The system according to claim 17, wherein in the data transfer network, the parameter preferences received from the device management server are arranged to be handled by modifying them or by adding new setting to them.

19. The system according to claim 16, wherein in the terminal is installed at least one service of a service provider, in which case the terminal is configured to send information on change of the service preferences to the device management server and the controlling element of the device management server is configured to determine the parameter preferences that correspond to the service changed in the terminal from the service provider.

20. The system according to claim 19, wherein the system is configured to determine the parameter preferences by sending the information on the change of the service preferences received from the terminal from the device management server to the service provider, in which case the service provider is configured to perform the terminal configuration.

21. The system according to claim 16, wherein the terminal comprises at least one accessory connection, in which case said comprises a connection bus for detecting whether an accessory has been connected to said accessory connection.

22. The system according to claim 16, wherein at least one user module is installed in the terminal, in which case said detecting means comprises a user module connection for transmitting information between the user module and the terminal.

23. The system according to claim 22, wherein a user identity is stored in the user module, that a user identity read previously from the user module is stored in the terminal, in which case in order to determine a change in the terminal capabilities, the system is configured to compare the user identity stored in the user module and the user identity stored in the terminal.

24. The system according to claim 22, wherein an equipment identity is stored in the terminal, that an equipment identity read previously from the terminal is stored in the user module, in which case in order to determine a change in the terminal capabilities, the system is configured to compare the equipment identity stored in the user module and the equipment identity stored in the terminal.

25. The system according to claim 16, wherein it comprises an installing element for installing and updating applications in a terminal, as well as for removing an installed service from the terminal, in which case said detecting element comprises means for detecting the installation, update and removal of applications.

26. The system according to claim 25, wherein capability information of the terminal has been provided to the terminal in the installed application.

27. The system according to claim 16, wherein the terminal comprises message formation element for forming a request message including a request for providing parameter preferences to the terminal, and said transmitter is configured to send said request message to a data transfer network.

28. The system according to claim 27, wherein a request message formed in the message formation means is a UAProf message.

29. The system according to claim 16, wherein from the terminal is configured to send at least the following capability information via a mobile communication network to a device management server:
a protocol supported by the terminal, which can be used in transmitting parameter preferences to the terminal,
information on the manufacturer of the terminal,
information on the model of the terminal, and
information on the software version of the terminal.

30. The system according to claim 16, wherein the terminal comprises memory for storing all the parameters stored by the users that have used the terminal as well as the corresponding user identities, wherein the system further comprises an examining element configured to examine whether the previously used user identities and the corresponding parameters are stored in the terminal, in which case the system is configured to prevent sending information on the capabilities of a terminal to a data transfer network if the examining element detected that the previously used user identities and the corresponding parameters are stored in the terminal, and configured to take the previously stored parameters into use.

31. The system according to claim 16, wherein the terminal is a wireless terminal.

32. A method in the configuration of a terminal, where information used in configuration is sent from the terminal to the device management server, wherein in the terminal are examined changes in the capabilities of the terminal, and if a change is detected in the terminal capabilities, information on the changed capabilities is transmitted to the device management server, where the preferences of the parameters that correspond to the changed capabilities are determined, and information on the new parameter preferences is sent to the terminal, where the configuration of the terminal is performed according to the new parameter preferences.

33. The method according to claim 32, wherein in the device management server are determined parameter preferences that correspond to the terminal preferences, and the parameter preferences are sent to the terminal.

34. The method according to claim 33, wherein in the data transfer network the parameter preferences received from the device management server are handled by modifying them or by adding new preferences to them.

35. The method according to claim 32, wherein in the terminal there is at least one accessory connection, in which case in order to detect changes in the terminal capabilities, it is examined whether an accessory has been connected to the accessory connection.

36. The method according to claim 32, wherein at least one user module is installed in the terminal, in which case in order to detect changes in the terminal capabilities, information is transmitted between the user module and the terminal.

37. The method according to claim 36, wherein a user identity is stored in the user module, that a user identity read previously from the user module is stored in the terminal, in which case in order to determine a change in the terminal capabilities, the user identity stored in the user module and the user identity stored in the terminal are compared.

38. The method according to claim 36, wherein an equipment identity is stored in the terminal, that an equipment identity read previously from the terminal is stored in the user module, in which case in order to determine a change in the terminal capabilities, the equipment identity stored in the user module and the equipment identity stored in the terminal are compared.

39. The system according to claim 32, wherein the terminal comprises means for installing and updating applications in a terminal as well as for removing them from the terminal, in which case the detection of change in the capabilities of the terminal is performed in connection with the installation, update and removal of applications.

40. The method according to claim 39, wherein the capability information of the terminal is provided to the terminal in the application to be installed.

41. The method according to claim 32, wherein in the terminal is formed a request message for transmitting information on the change of terminal capabilities to the device management server, in which case a request for providing parameter preferences in the terminal is transmitted in the request message.

42. The method according to claim 41, wherein the request message is an UAProf message.

43. The method according to claim 32, wherein from the terminal is sent at least the following capability information to a device management server:
a protocol supported by the terminal, which can be used in transmitting parameter preferences to the terminal,
information on the manufacturer of the terminal,
information on the model of the terminal, and
information on the software version of the terminal.

44. The method according to claim 32, wherein in the terminal are stored the parameters stored by all the users that have used the terminal, as well as the user identities corresponding to them, in which case it is examined in the method, whether the previously used user identity and the corresponding parameters are stored in the terminal, in which case if the examination proves that a previously used user identity and the corresponding parameters are stored in the terminal, sending information on the terminal capabilities from the terminal to the data transfer network is prevented and the previously stored parameters are taken into use in the terminal.

45. A computer-readable medium to be used in the configuration of a terminal, which computer software product is provided with machine executable program commands for sending information used in configuration from the terminal to a device management server, wherein the computer software product comprises machine executable program commands for determining change in the terminal capabilities, for sending information on the changed capabilities of a terminal to the data transfer network to be delivered to the device management server, for receiving new parameter preferences sent from the device management server to the data transfer network, and for configuring the terminal according to the new parameters.

46. An apparatus comprising:
a control; and
memory including program code,
the memory and the computer program code configured to, with the control, cause the apparatus at least to:
detect a change in the capabilities of the apparatus,
transmit information on the change of the apparatus capabilities over a data transfer network to a device management server, and receive from the device management server over the data transfer network new parameter preferences corresponding to the changed capabilities for the configuration of the apparatus.

47. A system, which comprises a terminal, a device management server, and a data transfer network for transmitting information used in connection with terminal configuration between the terminal and the device management server, the terminal comprises means for detecting a change of the capabilities of the terminal, in which case the system comprises means for transmitting the information on the change of the terminal capabilities to the device management server, means for determining parameter preferences corresponding to the changed capabilities, and means for sending the parameter preferences that correspond to the new capabilities to the terminal for configuring the terminal, and which terminal comprises means for receiving from the device management server new parameter preferences for the configuration of the terminal.

48. Method for configuring a terminal, comprising:

examining changes in capabilities of the terminal in said terminal and, if a change is detected in the capabilities of the terminal, transmitting a signal having information indicative of changed capabilities of the terminal, receiving in a device management server the signal having information indicative of the changed capabilities of the terminal and, in response thereto, determining references of parameters corresponding to said changed capabilities for sending a new parameter preferences signal, and receiving said new parameter preferences signal in said terminal and, in response thereto, performing said configuration of the terminal according to the new parameter preferences.

49. Method of claim 48, further comprising the step of examining in said terminal whether an accessory has been connected to an accessory connection in order to detect changes in the terminal capabilities.

50. The method of claim 48, further comprising transmitting information between a user module and the terminal in order to detect changes in the terminal capabilities.

51. The method of claim 48, further comprising detection of installation, update and removal of applications in order to determine a change in the terminal capabilities.

* * * * *